Patented Nov. 12, 1940　　　　　　　　　　　　　　　　　2,220,980

UNITED STATES PATENT OFFICE 2,220,980

PARASITICIDE

William P. ter Horst, Packanack Lake, N. J., assignor, by mesne assignments, to United States Rubber Company, New York, N. Y., a corporation of New Jersey No Drawing. Application October 14, 1938, Serial No. 234,957

1 Claim. (Cl. 167—33)

This invention relates to improvements in parasiticidal preparations such as fungicides, fumigants, insecticides, etc.

More particularly the invention relates to a parasiticidal preparation containing as an active constituent a 2,5-dialkyl pyrrolyl compound.

A preferred compound is 2,5-dimethyl-pyrrole having the formula

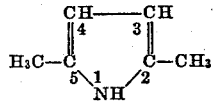

This chemical can be readily made in known manner from acetonyl-acetone and ammonia, and possesses marked toxicity towards living organisms that are injurious to man. Its toxic properties are shown in the results of the following tests:

1. A solution was made up consisting of 10% 2,5-dimethyl-pyrrole, 1% Emulphor EL, a commercial emulsifying agent, and 89% white oil. An emulsion was made comprising 1 part of the above described 10% solution of 2,5-dimethyl-pyrrole and 100 parts of water. Leaves of Golden Gleam nasturtium on which were placed 409 black bean aphids (Aphis rumicis) were thoroughly sprayed with this emulsion at a pressure of 17 lbs.

At the end of 24 hrs., 389 aphids had died, which is equivalent to a 95.1% mortality, whereas in a control experiment in which 580 aphids were used, only 11 had died at the end of 24 hrs., which is equivalent to a 1.8% mortality.

2. 2,5-dimethyl-pyrrole is also an excellent fumigant. Black carpet beetle larvae (Attagenus piceus) were placed in a jar and 2,5-dimethyl-pyrrole was applied as a mist. The tabulation that is given below shows the effectiveness of this fumigant in low concentrations.

| Concentration of 2.5-dimethyl-pyrrole | Percent dead, 24 hours |
|---|---|
| 1# per 100 cu. ft. | 100 |
| ½# per 100 cu. ft. | 100 |
| ¼# per 100 cu. ft. | 100 |
| ⅛ per 100 cu. ft. | 100 |
| Control experiment—no chemical | 0 |

3. 2,5-dimethyl-pyrrole shows marked toxicity to the fungus Macrosporium sarcinaeforme in concentrations of 5 grams per liter of water, or less, preferably in the presence of a wetting agent such as sulphite lye, Goulac or others. In many instances the spore germination was reduced to 0%.

4. 2.5-dimethyl-pyrrole is toxic towards Colorado potato beetle larvae. Irish potato leaves were dipped in a 10% water emulsion of 2,5-dimethyl-pyrrole and allowed to drain. Colorado potato beetle larvae were placed upon the leaves. All larvae were dead in 45 mins., whereas there was no mortality in a control run.

Having thus described my invention, what I claim and desire to protect by Letters Patent is:

A parasiticide preparation containing as an active constituent, 2,5-dimethyl pyrrole.

WILLIAM P. TER HORST.